United States Patent

Fisher et al.

[11] Patent Number: 5,966,471
[45] Date of Patent: Oct. 12, 1999

[54] METHOD OF CODEBOOK GENERATION FOR AN AMPLITUDE-ADAPTIVE VECTOR QUANTIZATION SYSTEM

[75] Inventors: Sydney T. Fisher, Glenside, Pa.; Charles D. Bodson, Arlington, Va.

[73] Assignee: United States of America, Washington, D.C.

[21] Appl. No.: 08/999,051

[22] Filed: Dec. 23, 1997

[51] Int. Cl.$^6$ .............................. G06K 9/36; G06K 9/38
[52] U.S. Cl. ............................................................ 382/253
[58] Field of Search ..................................... 382/251, 253; 358/433; 348/410, 414, 417, 418, 420, 421, 422

[56] References Cited

U.S. PATENT DOCUMENTS

| | | | |
|---|---|---|---|
| 4,862,261 | 8/1989 | Tanaka | 348/422 |
| 4,933,761 | 6/1990 | Murakami et al. | 348/422 |
| 5,021,971 | 6/1991 | Lindsay | 348/422 |

*Primary Examiner*—Phuoc Tran
*Attorney, Agent, or Firm*—Defense Information Systems Agency; Flayo O. Kirk

[57] ABSTRACT

The present invention relates to the field of vector quantization of transmitted imagery. In particular, the invention is a method for automatically generating a codebook for use in the transmitter and receiver components of an amplitude-adaptive normalized differential vector quantization system based upon a specified signal-to-noise ratio goal. In accordance with this method, the specified signal-to-noise ratio goal automatically derives the amplitude thresholds and other required data to determine the tradeoff between image quality and data compression for the transmitted imagery.

11 Claims, 2 Drawing Sheets

METHOD OF CODEBOOK GENERATION FOR AN AMPLITUDE-ADAPTIVE VECTOR QUANTIZATION SYSTEM

FIELD OF THE INVENTION

The present invention relates to the field of vector quantization of transmitted imagery and, more particularly, is directed to a method for automatically generating a codebook for use in the transmitter and receiver components of an amplitude-adaptive vector quantization system based upon a specified signal-to-noise ratio goal. This signal-to-noise ratio goal serves as a convenient single control of the trade-off between received image fidelity and data compression. The larger the ratio, the greater the fidelity, but the less compression.

BACKGROUND OF THE INVENTION

Vector quantization as used in the transmission of imagery consists of dividing an image to be transmitted into rectangular blocks, or vectors, of pixels, referred to as the "starting image vectors." A vector quantization system generally comprises a transmitter unit and a receiver unit. The transmitter compares each starting image vector with a large library of typical vectors, called a "codebook," and selects the codebook vector that best approximates the starting image vector. The transmitter then encodes and transmits a codebook index corresponding to the selected codebook vector. The receiver, equipped with a copy of the codebook, decodes the index, retrieves the selected library vector and inserts it into the output image.

Differential vector quantization (DVQ) involves first obtaining a mean value of the starting image vector (referred to as the vector mean or image block mean) by averaging the pixel elements that make up the starting image vector, and rounding the average to the nearest integer. A difference vector is then obtained by subtracting the vector mean from each pixel in the string of pixels that make up the starting image vector. The vector mean is modulated, such as by pulse code modulation (PCM) or by difference pulse code modulation (DPCM), and is transmitted to a companion receiver unit, while the difference vector is used to obtain and transmit a corresponding vector index from the codebook. Normalized differential vector quantization (NDVQ) is DVQ with the codebook vectors normalized such that their magnitudes always equal 1. This method of vector quantization provides higher vector data compression than does DVQ, but requires the separate transmission of the difference vector magnitude.

A newer method of vector quantization is amplitude-adaptive NDVQ, details of which are described, for example, in a publication entitled "Proposal on Component Vector Quantization Coding Scheme" by Mitsubishi Electric Corporation, Annex 4 of CCITT Study Group VIII, Geneva (Dec. 1–12, 1986) (hereinafter "SG VIII"), and in other publications cited therein. In an amplitude-adaptive NDVQ system, a vector mean is subtracted from the pixels of a starting image vector, leaving a difference vector to be quantized. The vector mean is transmitted separately by PCM or DPCM. A binary tree-driven codebook search at the transmitter selects a normalized codebook vector from the codebook library which best correlates with the difference vector, i.e., the codebook vector which together with the difference vector produces the largest dot product. Since the codebook vectors are normalized, this selection is equivalent to minimizing the distance between the two vectors. The dot product is then transmitted by PCM or DPCM, and the index to the selected codebook vector is encoded and transmitted after index correction. Upon receiving this information, the receiver looks up the normalized codebook vector, multiplies it by the dot product and adds the vector mean to form the decoded version of the starting vector. The principal benefit of amplitude-adaptive NDVQ is that, for a given average distortion (square distance between the starting and ending difference vectors), the codebook can be more sparsely populated for small magnitude difference vectors than for large. It might be inferred from SG VIII that the codebook is partitioned by vector magnitude, with small sub-codebooks for small magnitude difference vectors and large sub-codebooks for large magnitude difference vectors. Consequently, it appears that small magnitude difference vectors are assigned short codebook vector index codes, and since small magnitude difference vectors occur much more frequently than large magnitude difference vectors, very high vector data compression can be achieved with good image quality.

However, SG VIII fails to address how to generate an efficient, robust (one that performs well with any image) codebook when there is a specified signal-to-noise ratio goal. The prior art does not appear to have addressed this problem either.

SUMMARY OF THE INVENTION

Accordingly, this invention provides for automatically generating an efficient, robust codebook for use in the transmitter and receiver components of an amplitude-adaptive NDVQ system based upon a specified signal-to-noise ratio goal. The invention automatically derives and stores, for each tree level in a codebook binary tree search, a threshold to which the NDVQ transmitter and receiver compare difference vector magnitudes or dot products. Because, as presently shown, computing a threshold requires taking a square root, the preferred embodiment stores the square of the threshold, instead of the threshold itself, and the magnitude or dot product to be compared is first squared. Hereafter, in passages referring to thresholds and comparisons of difference vector magnitudes or dot products, the fact that the squares of these quantities are compared, instead of the quantities themselves, is to be understood. The invention includes a codebook addressing scheme using a base address stored in the codebook for each binary search tree level. A relative address, transmitted as the codebook index, locates the codebook vector relative to the base address. The receiver obtains the base address from the received dot product and a locally-stored threshold table. The disclosed method also provides for vector index correction, as appropriate.

In accordance with the present invention, a method of codebook generation is provided, for use in a system of transmitting imagery comprising an NDVQ transmitter and an NDVQ receiver, and includes the steps of generating a codebook from a large number of normalized training vectors. The resulting codebook contains a plurality of tree levels, with each of the tree levels having a threshold value. A starting image vector to be transmitted is inputted to the NDVQ transmitter, and a vector mean and a difference vector are calculated from the starting image vector, with the vector mean being modulated. Then, the difference vector is used to select, by conducting an amplitude-adaptive binary tree search of the codebook, a normalized codebook vector that best correlates with the difference vector. A dot product is obtained of the selected normalized codebook vector and the difference vector, and the dot product is modulated. The modulated vector mean, the modulated dot product, and the index to the selected vector (referred to as the vector index) are then transmitted to the NDVQ receiver. In the NDVQ receiver, the vector index is decoded, and is used along with the dot product to retrieve the normalized codebook vector from the codebook. The normalized codebook vector is then multiplied by the dot product, and the vector mean is added to the result to produce an output image vector.

The method further comprises, for automatically generating threshold values for each of the tree levels used in the amplitude-adaptive binary tree search of the codebook, the steps of optimizing each of the tree levels during codebook generation. A threshold value is calculated for each of the tree levels according to the formula $T=(DG/D)^{1/2}$, where T is the threshold value, DG is the mean-square distance goal derived from a usersupplied signal-to-noise ratio goal, and D is the mean-square distance of all normalized training vectors from their respective normalized codebook vectors in a given tree level, with $DG=bm^2/r$, where b is the number of difference vector components (pixels per block), m is the maximum gray level value, and $r=m^2/$(pixel-mean-square error goal), and where this ratio, expressed in decibels, is supplied to the system. The calculated threshold value assigned to each tree level is stored in the codebook.

Further aspects of the method include the step of applying correction to the vector index prior to its being transmitted. This correction is made if the received value of the dot product is so different from the actual dot product that, without vector index correction, the receiver would compute the wrong tree level. In that event, index correction comprises finding a suitable vector in the tree level calculated by the receiver and transmitting its relative index. A step is also provided in the method by which the vector index is encoded using straight binary coding, with the number of data bits equal to the tree level number (with index correction, if necessary) at which the binary tree search terminates.

In a preferred embodiment, a method is provided where generation of the codebook uses a large training vector set comprising a plurality of training vectors, wherein separate training vectors are constructed from all possible block position combinations with respect to the training image borders. The plurality of training vectors is sorted in a descending order of difference vector magnitude, and the magnitude and normalized vector components are carried in each training vector record. A subset of the plurality of training vectors is created comprising a predetermined number of training vectors having the largest difference vector magnitude, and during codebook generation, a training vector having a magnitude at or below the threshold value of the next lower tree level, that is the tree level most recently optimized, is ignored, so that as one of the training vectors is ignored, all the rest of the training vectors remaining in the training vector set are ignored.

In accordance with another aspect of the invention, the generation of the codebook further comprises the substeps of optimizing codebook tree levels. The one optimized vector for all the training vectors in tree level "0" is split into two vectors, which are then optimized, to create tree level "1" and, subsequently, the two optimized vectors are split into four vectors, which are then optimized, to form tree level "2." This optimization procedure is continued until either no more tree levels are needed to satisfy the signal-to-noise ratio goal for the largest magnitude training vector or further tree growth is prohibited by memory limitations.

In still a further aspect of the invention, the method described includes, in the NDVQ transmitter, the steps of selecting a normalized codebook vector from a generated codebook by conducting a binary tree search of a plurality of tree levels in the codebook, where the highest tree level has a threshold of "infinity." An initial binary tree search is performed commencing at a tree level having a very low threshold, and includes calculating a dot product, with the initial binary tree search terminating when the magnitude of the difference vector is equal to or below the threshold of the current tree level. If, at this tree level, the dot product is above the threshold of the next lower tree level, then the search is complete. Otherwise, the search is continued by backing up through the dot products and relative codebook indices, saved during the initial search, until a tree level is reached wherein the dot product corresponding to the tree level is above the threshold of the next lower tree level, or until a tree level of 0 is reached, at which point the binary tree search is terminated. In another aspect of this method, the step of terminating the binary tree search occurs at the lowest tree level where a received dot product is at or below the threshold of that tree level. In another aspect of this method, the step of terminating the binary tree search occurs if the dot product corresponding to a first tree level search is above the threshold of the next lower tree level.

In a further preferred embodiment of the invention, a method is presented of storing data in a codebook used in the transmission of imagery by means of NDVQ wherein the data represent: (a) normalized codebook vectors, each vector having vector components; (b) a binary search tree having a plurality of search tree levels and search tree nodes, each node corresponding to a normalized codebook vector; (c) a table of normalized codebook vector base indices, wherein each of the normalized codebook vector base indices corresponds to one of the plurality of search tree levels and to one of the codebook vectors in that search tree level; and (d) a table of vector magnitude thresholds where each threshold corresponds to one of the search tree levels. This method comprises the steps of storing the normalized codebook vectors contiguously, with a first vector associated with a search tree level 0, a second set of vectors comprising two vectors associated with a search tree level 1, and continuing with such a progression until the $2^L$ vectors associated with search tree level L are stored. Each of the vector components associated with each normalized codebook vector is packed in one byte comprising a signed eight-bit fraction to which is added a bias of 128 for mapping negative values into a 0–127 range. The method further comprises the steps of producing a relative codebook vector index by assigning an index to each of the search tree nodes corresponding to a codebook vector relative to a first vector in a search tree level to which each of the search tree nodes belongs, storing in the table of normalized codebook vector indices an absolute codebook vector index for a first codebook vector in each of the search tree levels, with the first codebook vector comprising a relative index of 0, and also the step of storing in the table of vector magnitude thresholds a threshold value for each of the search tree levels, where the thresholds are monotone increasing with increasing search tree level. In a further aspect of this method, a step is included whereby the binary search tree is used to partition the codebook according to difference vector magnitude.

Other features and advantages of the invention will be set forth in, or apparent from, the following detailed description of the preferred embodiments of the invention which follow.

BRIEF DESCRIPTION OF THE DRAWINGS

The invention will become more readily apparent from the following exemplary description taken in conjunction with the accompanying drawings, in which.

DETAILED DESCRIPTION OF THE PREFERRED EMBODIMENTS

Figure 1:
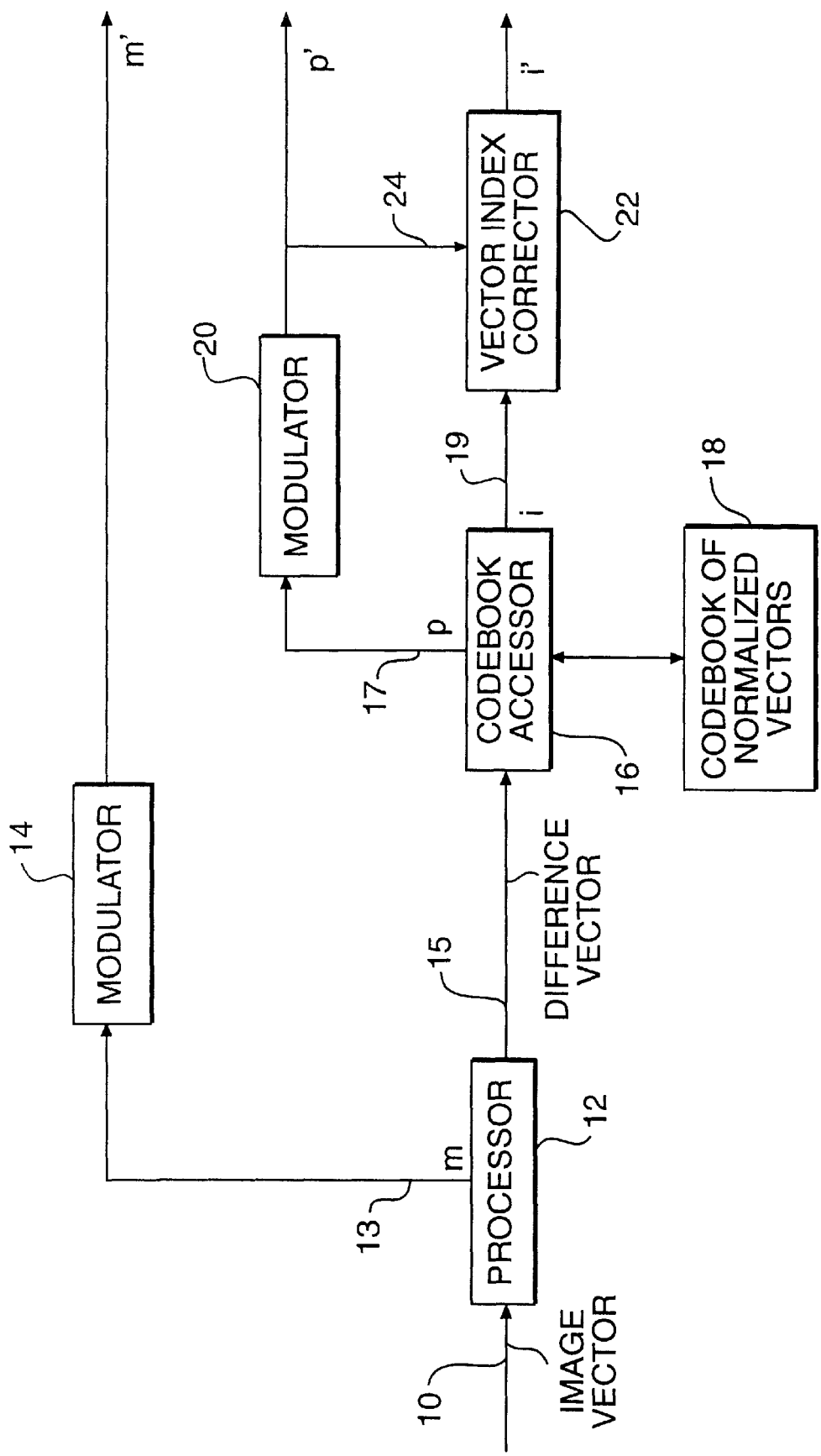
FIG. 1 is a block diagram of an amplitude-adaptive NDVQ transmitter, as known in the art.
Figure 2:
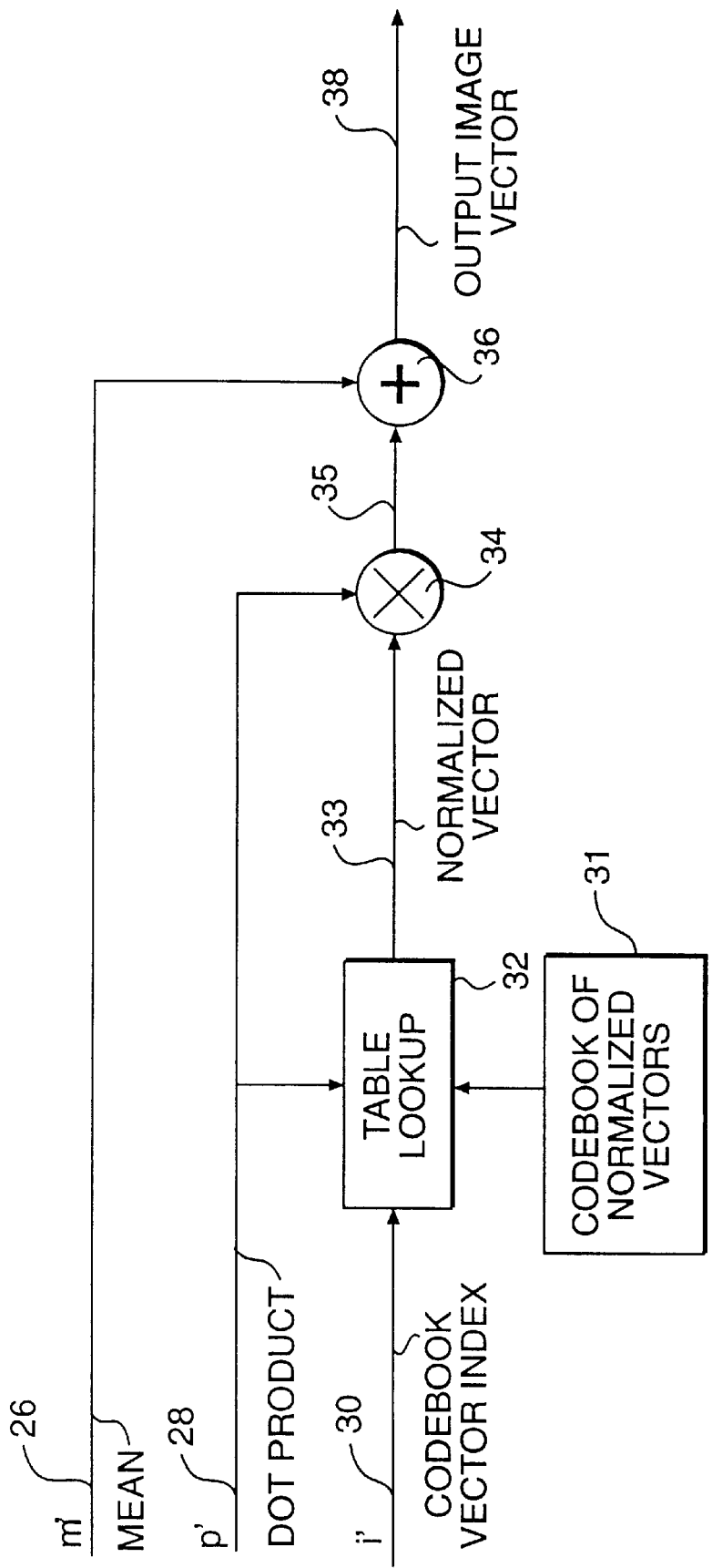
FIG. 2 is a block diagram of an amplitude-adaptive NDVQ receiver, also as known in the art, for use with the transmitter of FIG. 1.

The basic units of an amplitude-adaptive NDVQ system are shown for the transmitter in FIG. 1 and for the receiver in FIG. 2. The transmitter unit of FIG. 1 comprises a processor 12 that receives a starting image vector or image block on line 10. One line output 13 from processor 12 is connected to a modulator 14 and provides an output m corresponding to the vector (image block) mean. Modulator 14 outputs a modulated signal m' which corresponds to the transmitted value of m and is transmitted to the receiver of FIG. 2. A second "difference vector" output at line 15 from processor 12 is connected to a codebook accessor 16 which, in turn, is connected to receive data from a codebook 18 that comprises a library of codebook vectors addressed by vector indices. Codebook accessor 16 is connected by an output line 17 to a further modulator 20. The input to modulator 20 is a signal p corresponding to the dot product of the difference and codebook vectors, and modulator 20 produces a modulated signal p' that corresponds to the transmitted value of p and is also transmitted to the receiver of FIG. 2. A second output line 19 from codebook accessor 16 is connected to a vector index corrector 22. The input to the vector index corrector 22 is a signal i corresponding to the codebook vector index, and the vector index corrector outputs a corrected codebook vector index signal i' for transmission to the receiver. The signal p' from modulator 20 is also provided over an output line 24 to a second input of vector index corrector 22.

The receiver unit shown in FIG. 2 comprises a table lookup 32 that receives transmitted signals p' and i', and is also connected to receive data from a codebook 31. The codebook 31 in the receiver is a duplicate of the codebook 18 in the transmitter. The output of table lookup 32 is connected over line 33 to multiplier 34 which also receives signal p' and which outputs a signal over line 35 to adder 36. Adder 36 receives both this signal and the transmitted signal m', and provides at an output line 38 an output image vector.

The transmission of signals between the transmitter and receiver is performed using known techniques, such as by direct wire connection or through radio frequency transmission.

In a typical operation of the amplitude-adaptive NDVQ system of FIGS. 1 and 2, an image vector is inputted to processor 12 where the vector (image block) mean and difference vector are calculated. The mean vector is calculated as the average value of the pixels that make up the image vector. The average value of the pixels is obtained and rounded to the nearest integer, and is outputted as a vector (image block) mean signal m to modulator 14 as described above. Modulator 14 provides either PCM or DPCM of signal m, to produce the signal m', the modulated vector mean. The difference vector is obtained by subtracting the vector mean from each pixel value.

As stated above, the difference vector is input to codebook accessor 16 which searches the library of codebook vectors in codebook 18 for the codebook vector most closely matching the difference vector in accordance with the tree search method described above. When the search is complete, the dot product, p, of the difference vector and the selected codebook vector is calculated and outputted to the further modulator 20 as mentioned previously. Modulator 20 modulates signal p using either PCM or DPCM and outputs a modulated dot product signal p' which is transmitted to the receiver.

The library of vectors in codebook 18 are each normalized so that their magnitudes are the same, and each is stored according to a codebook vector index. As set forth above, the codebook vector index, denoted i, is outputted from codebook accessor 16 to the vector index corrector 22 which also receives the modulated dot product, p'. Vector index corrector module 22 provides correction to the selected codebook vector index i and transmits a corrected codebook vector index signal i' such that i' is the index to a vector in the binary tree level computed by the receiver from p' and the threshold table stored in the codebook. If this tree level is the same as that from which index i was derived, then i'=i. Otherwise, i' is the index to a suitable vector in the tree level computed by the receiver.

As noted previously, at the receiver in FIG. 2, the transmitted corrected codebook vector index i' is received as an input to table lookup 32. The dot product signal p' is inputted to table lookup 32 which uses signals i' and p' to retrieve the normalized vector from codebook 31 corresponding to the codebook vector selected from codebook 18 in the transmitter unit. The normalized vector from codebook 31 is outputted from table lookup 32 to multiplier 34 and the transmitted dot product p' is also inputted to multiplier 34 wherein the difference vector is reconstructed by taking the product of the transmitted dot product p' and the normalized vector. Added to this product by adder 36 is the transmitted value of the vector mean m', so as to produce at 38 the output image vector.

The codebooks 18 and 31 described above provide a large library of typical vectors, and the operation of selecting and retrieving appropriate vector indices from the codebooks in the transmitter and receiver units is a key factor in the effective overall operation of an amplitude-adaptive NDVQ system. In accordance with one important aspect of the invention, a method is disclosed for generation of a codebook for use in such a NDVQ system.

The method of codebook generation according to the invention uses the existence of thresholds that control an amplitude-adaptive binary tree search in the selection of a codebook vector. The codebook generation process involves deriving the thresholds automatically from a single user input, namely, a desired signal-to-noise ratio or signal-to-noise ratio goal expressed in decibels. Each tree level of the codebook is optimized during codebook generation as described hereinbelow to produce an optimal codebook. After each tree level has been optimized during codebook generation, it is assigned a threshold value according to the formula:

$$T=(DG/D)^{1/2} \qquad (1)$$

where T is the threshold, DG is the mean-square distance goal derived from the user-supplied signal-to-noise ratio goal, and D is the mean square distance of all the normalized training vectors from their respective normalized codebook vectors in that tree level. These thresholds are stored in the codebook, a copy of which, as stated above, resides in both the transmitter (codebook 18 of FIG. 1), and in the receiver (codebook 31 of FIG. 2). Since D decreases with increasing tree level, the threshold value increases accordingly. The mean-square distance goal, DG, is given by the formula:

$$DG = bm^2/r \qquad (2)$$

where b is the block size (in pixels), m is the maximum gray level (255), and r equals $m^2$/(the pixel-mean-square error goal). The user supplies information for determining the value of r, expressed in decibels. In accordance with equation (2) above, the larger the value of r, the smaller the thresholds, the deeper the transmitter tree searches, and hence the better the received image quality, but the less vector data compression.

A preferred method of codebook generation according to the invention uses a subset of a very large training vector set. The very large training vector set is created from a special training image containing, for example, three broad, horizontal stripes, each taken from a "busy" part of a different test image. The training vectors are constructed from all possible combinations of block positions with respect to the training image borders, so that image features appear in the training vector set in all possible position combinations relative to the block boundaries. The training vectors are sorted into descending order of difference vector magnitude. The magnitude is carried in each training vector record as well as the normalized vector itself. The subset of the very large training vector set contains those training vectors having the largest difference vector magnitudes (a difference vector is formed by subtracting the vector mean from the vector pixels). This leads to a short codebook generation execution time, and a very robust codebook, i.e., one that will perform well for almost any image.

During codebook generation, a training vector whose magnitude is at or below the threshold of the search tree level that has just been optimized is ignored while a new tree level is being optimized because, in the transmitter, a tree search with the corresponding difference vector would never reach the new level. Stated differently, the higher the tree level, the greater the magnitude a training vector must have to participate in further tree growth. Because the training vectors are sorted by descending order of difference magnitude, as soon as one training vector is ignored, the rest of the sorted set can be ignored.

The codebook generator is programmed to process at most N training vectors during any one tree level iteration, with the N training vectors being those having the largest difference vector magnitudes. Selecting large-magnitude training vectors amounts to selecting those image blocks having the largest contrast, and not blocks from a particular part of the training image. This selection process, in addition to building the original training image from high-contrast parts of the contributing images, ensures an adequate supply of training vectors with sufficient magnitude to propagate to the highest search tree level, which is a contributing factor to the robustness of the generated codebook.

The method of the codebook generation according to the invention employs the basic LBG (Linde, Buzo, and Gray) algorithm which finds a set of vectors that gives minimum distortion to the training vectors selected. The general LBG algorithm starts with a single vector optimized with respect to all the training vectors. An operation called "vector splitting" is employed to create two vectors, which are then optimized. These two vectors are in turn split to form four vectors, which are then optimized. This process continues, with each split doubling the number of vectors in an optimal codebook to form a new codebook to be optimized. The process ends when the codebook reaches the desired size.

In the present invention, which generates an optimal amplitude-adaptive NDVQ codebook, codebook generation begins with one vector optimized for all the training vectors. This vector is "split" into two, and the two-vector tree level is optimized. The two vectors are then split, the four-vector tree level is optimized, and so on. The method implements the split by using as a split vector that training vector which is nearest to, but different from, the parent vector, to divide the vector subspace belonging to the parent vector roughly in half, so that approximately an equal number of training vectors belong to (are nearest to) the parent vector and the split vector.

The transmitter binary tree search method employed in accordance with a preferred embodiment of the invention is based on obtaining the dot product instead of the difference vector magnitude. Transmitting the dot product gives less distortion for a given vector selection than transmitting the difference vector magnitude. In addition, the method of the invention preferably provides for keying a preliminary search to the vector magnitude, and then modifying it, if necessary, to obtain the dot product. In the absence of this precaution, a poor correlation of a high-magnitude difference vector with a codebook vector at a low tree level might give a dot product below a low threshold. Thus, a high-contrast vector might be replaced by a "flat" or badly distorted low contrast vector.

The initial tree search starts at the root of the tree, which has a very low threshold, and terminates at the lowest tree level for which the difference vector magnitude is at, or below, the established threshold (the highest tree level has a threshold of "infinity"). If the dot product resulting from the initial search is above the threshold of the next lower tree level, the search ends, except for the vector index correction, which is performed by vector index corrector 22. Otherwise, the search backs up through dot products and relative codebook vector indices, saved as the lower tree levels were searched, until a level is reached where the above condition is met, or level 0 is reached. The codebook vector index, with correction, is preferably transmitted in straight binary code with no further encoding.

The codebook generated according to the invention thus contains four groups of data: (1) the normalized codebook vectors, (2) a binary search tree, each node of which corresponds to one codebook vector, (3) a table of base codebook vector indices, one per search tree level and (4) a table of vector magnitude thresholds, one per search tree level.

The normalized codebook vectors are stored contiguously with the single vector associated with search tree level 0 first, the two vectors for search tree level 1 second, and so on, with the $2^L$ vectors for search tree level L last. Each normalized codebook vector component, having a value between −1 and 1, is packed in one byte containing a signed eight-bit fraction to which is added a bias of 128 to map the negative values into the range 0–127. The rounding errors incurred by packing are well below the distortion produced by vector quantization, even with the best-performing codebook.

Each binary search tree node contains an index to its codebook vector relative to the first vector in the tree level to which the node belongs. Since tree level L contains $2^L$ nodes, each corresponding to one codebook vector, a relative codebook vector index for level L can be expressed in L bits of data. It is the relative corrected codebook vector index, i', that is transmitted.

The table of base codebook vector indices contains the absolute codebook vector index for the first (relative index 0) codebook vector in each search tree level. Thus, having computed the tree level, the receiver uses the transmitted, corrected codebook vector index i' to retrieve from codebook 31 the selected codebook vector by looking up the base index in codebook 31, and adding thereto the received relative index.

Finally, the table of vector magnitude thresholds contains a threshold value for each tree level. These thresholds are monotone increasing (or at least non-decreasing) with increasing tree level. A binary tree search ultimately ends, after index correction, if necessary, at the lowest tree level such that the received dot product p' is at, or below, the threshold for that level. Thus, the receiver "knows" at which tree level the search ended and, therefore, knows the base index. As stated above, the thresholds are automatically set during codebook generation by a signal-to-noise ratio goal (decibels) input by the user.

The number of relative codebook vector index bits is equal to the tree level number where the search ends. Since the magnitudes of difference vectors are usually small, the search usually ends at a low tree level, and so the relative codebook vector index code is usually short. In many cases, the starting vector is flat, i.e., there is a difference vector magnitude of zero, and therefore no vector index is transmitted. The fact that the method of the invention provides for the transmission of no vector index is significant in that practice has shown that the transmission of no vector index as a result occurs fairly often.

The transmission of the relative codebook vector index in straight binary code gives an average bit rate, for a vector containing 16 pixels, of only a few hundredths of a bit per pixel worse than theoretical entropy coding based on the statistics of the current transmission. Thus, the relative codebook index does not need to be further encoded.

It will be understood by those skilled in the art that although the invention has been described in relation to exemplary, preferred embodiments thereof, variations and modifications can be effected in these preferred embodiments without departing from the scope and spirit of the invention.

What is claimed is:

1. A method of codebook generation, used in an NDVQ system for transmitting imagery comprising an NDVQ transmitter and an NDVQ receiver, that includes steps of:

generating, from a large number of normalized training vectors, a codebook comprising a plurality of tree levels, each of said tree levels having a threshold value;

inputting to said NDVQ transmitter a starting image vector to be transmitted;

calculating a vector mean (of the starting image vector) and a difference vector from the vector mean and the starting image vector, and modulating said vector mean, such as by PCM or DPCM;

using the difference vector to select, by conducting an amplitude-adaptive binary tree search of said codebook, a normalized codebook vector best correlating with said difference vector, and a corresponding vector index;

obtaining a dot product of the selected normalized codebook vector and the difference vector and modulating said dot product; and transmitting the modulated vector mean, the modulated dot product, and the vector index to said NDVQ receiver;

and further includes steps in the NDVQ receiver of:

decoding the vector index and using said decoded vector index and said dot product to retrieve said normalized codebook vector from said codebook; and multiplying the normalized codebook vector by the dot product and adding the vector mean to the result to produce an output image vector;

said method further comprising, for automatically generating threshold values for each of said tree levels for use in said amplitude adaptive binary tree search of said codebook, the steps of:

optimizing each of said tree levels during codebook generation;

calculating a threshold value for each of said tree levels according to the formula $T=(DG/D)^{1/2}$, where T is the threshold value, DG is the mean square distance goal derived from a user-supplied signal-to-noise ratio goal, and D is a mean-square distance of all normalized training vectors from their respective normalized codebook vectors in a given tree level, with $DG=bm^2/r$, where b is the number of pixels per block of said difference vector, m is a maximum gray level value, and $r=m^2/(\text{pixel-mean-square error goal})$ wherein said ratio, r, expressed in decibels, is inputted to the system; and storing the calculated threshold value assigned to said each tree level in said codebook.

2. The method of codebook generation according to claim 1, comprising the step of applying a correction to said vector index prior to the transmitting of said vector index.

3. The method of codebook generation according to claim 1, comprising the step of encoding said vector index using straight binary coding.

4. The method of codebook generation according to claim 3, further comprising the step of encoding said vector index with a number of data bits equal to the tree level at which said binary tree search terminates.

5. The method of codebook generation according to claim 1, wherein said generating of said codebook uses a large training vector set comprising a plurality of training vectors constructed from a training image and wherein said training vectors are constructed from all possible block position combinations with respect to the borders of said training image, and wherein the method for generating said codebook further comprises the steps of:

sorting said plurality of training vectors in a descending order of difference vector magnitude;

carrying said magnitude in a record of each of said plurality of training vectors;

creating a subset of said plurality of training vectors comprising a predetermined number of training vectors having the largest of said difference vector magnitude;

ignoring, during codebook generation, a training vector having a said magnitude at or below a said threshold value of a said next lower tree level, that is the tree level most recently optimized, so that as one of said training vectors is ignored, all other of said training vectors remaining in said training vector set are ignored.

6. The method of codebook generation according to claim 5, wherein the generating of said codebook comprises the substeps of:

optimizing a first vector for all the training vectors;

splitting said optimized first vector into two vectors to create a two-vector search tree level, and optimizing said two-vector search tree level;

splitting said two vectors into four vectors to form a four-vector search tree level, and optimizing said search tree level;

continuing the above procedure until either no more tree levels are needed to satisfy the signal-to-noise ratio goal for the largest magnitude training vector or further tree growth is prohibited by memory limitations.

7. The method of codebook generation according to claim 6, wherein in the NDVQ transmitter, the selecting of a said normalized codebook vector from said generated codebook comprises conducting a binary tree search of a plurality of tree levels in said codebook, with the highest said tree level having a threshold of "infinity," and wherein the method of conducting said binary tree search further comprises the steps of:

performing an initial binary tree search, keyed to said difference vector magnitude, commencing at a tree level having a very low threshold, said initial search comprising the calculation of a said dot product; and continuing said binary tree search if said dot product corresponding to said first tree level search is equal to or below a threshold of said next lower tree level by backing up through the dot products and relative codebook vector indices until a tree level is reached wherein a dot product corresponding to a tree level is above a threshold of a next lower tree level, or until a tree level 0 is reached.

8. The method of codebook generation according to claim 7, further comprising the step of terminating said binary tree search at the lowest tree level where a received dot product is at or below a threshold for said lowest tree level.

9. The method of codebook generation according to claim 7, further comprising the step of terminating said binary tree search if said dot product corresponding to a first tree level search is above a said threshold of the next lower tree level.

10. A method of storing data in a codebook used in the transmission of imagery by means of NDVQ, wherein said data represent normalized codebook vectors, each vector comprising vector components; a binary search tree having a plurality of search tree levels and search tree nodes, each node corresponding to a normalized codebook vector; a table of normalized codebook vector base indices, wherein each of said normalized codebook vector base indices corresponds to one of said plurality of said search tree levels and to one of said codebook vectors in said search tree level; and a table of vector magnitude thresholds, wherein each of said vector magnitude thresholds corresponds to one of said plurality of search tree levels, said method comprising the steps of:

storing said normalized codebook vectors contiguously with a first vector associated with a search tree level 0 first, a second set of vectors comprising two vectors associated with a search tree level 1 second, and continuing such a progression until the $2^L$ vectors associated with search tree level L are stored last, and further wherein each of said vector components associated with each of said normalized codebook vectors is packed in one byte comprising a signed eight-bit fraction to which is added a bias of 128 for mapping negative values into a 0–127 range;

producing a relative codebook vector index by assigning an index to each of said search tree nodes corresponding to a codebook vector relative to a first vector in a search tree level to which said each of said search tree nodes belongs;

storing in said table of normalized codebook vector indices an absolute codebook vector index for a first codebook vector in each of said search tree levels, said first codebook vector comprising a relative index of 0; and storing in said table of vector magnitude thresholds a threshold value for each of said search tree levels, said thresholds being monotone increasing with increasing search tree level.

11. The method of storing data in a codebook according to claim 10, comprising the step of using said binary search tree to partition said codebook according to difference vector magnitude.

* * * * *